United States Patent [19]

Harata et al.

[11] 4,361,739
[45] Nov. 30, 1982

[54] TWO-DIRECTIONAL SWITCH

[75] Inventors: Shoichi Harata, Kasugai; Hirotsugi Kobayashi, Aichi, both of Japan

[73] Assignee: Kabushiki Kaisha Tokai Rika Denki Seisakusho, Aichi, Japan

[21] Appl. No.: 218,744

[22] Filed: Dec. 22, 1980

[30] Foreign Application Priority Data

Dec. 25, 1979 [JP] Japan ............................ 54-181112[U]

[51] Int. Cl.³ ........................ H01H 15/00; H01H 3/16
[52] U.S. Cl. ................................. 200/16 C; 200/61.27
[58] Field of Search ........... 200/16 C, 16 D, 4, 61.27, 200/61.3, 61.54, 157, 61.85, 61.88, 18

[56] References Cited

U.S. PATENT DOCUMENTS

| | | | |
|---|---|---|---|
| 2,683,193 | 7/1954 | Barcus | 200/61.3 X |
| 2,837,609 | 6/1958 | Clayton et al. | 200/16 C |
| 2,977,432 | 3/1961 | Spicer, Jr. | 200/61.27 X |
| 3,030,459 | 4/1962 | Elliott et al. | 200/16 C |
| 3,934,101 | 1/1976 | Jones | 200/61.27 X |
| 3,944,765 | 3/1976 | Kawai et al. | 200/61.27 |
| 4,115,670 | 9/1978 | Chandler | 200/18 |
| 4,219,706 | 8/1980 | Koch et al. | 200/4 |

Primary Examiner—J. R. Scott
Attorney, Agent, or Firm—Wenderoth, Lind & Ponack

[57] ABSTRACT

A two-directional switch for a motor cycle and the like having a control knob for a contact holder adapted to slide in a first direction and a second direction intersecting the first direction approximately at right angles therewith, and having the parts so arranged that the sliding movement in the first direction is guided by a guide plate, and the sliding movement in the second direction is guided by a guide member for guiding the guide plate, while engaging members are provided respectively between the guide plate and the contact holder or control knob and between the guide plate and guide member so as to prevent the control knob from unduly moving from a predetermined position in either of the first and second directions for maintaining the expected switch functioning.

8 Claims, 6 Drawing Figures

TWO-DIRECTIONAL SWITCH

BACKGROUND OF THE INVENTION

The present invention generally relates to an electrical switch and more particularly, to a two-directional or bi-directional switch for a two-wheeled motor vehicle or motor cycle and the like having a control knob for a contact holder adapted to slide in a first direction and a second direction intersecting the first direction approximately at right angles therewith, and is so arranged that the sliding movement in said first direction is guided by a guide plate, and the sliding movement in said second direction is guided by guide means for guiding said guide plate, while engaging means is provided respectively between the guide plate, contact holder or control knob and guide means so as to prevent said control knob from unduly moving from a predetermined position in either of said first and second directions, thereby to maintain an expected switch functioning.

Conventionally, in a two-wheeled motor vehicle or motor cycle, for example, a direction indicating switch and a dimmer switch for the head light change-over are arranged to be actuated by corresponding two knobs thereof, thus being not only considerably bulky in size, but having a complicated construction, with a certain problem remaining to be solved in the operability thereof.

SUMMARY OF THE INVENTION

Accordingly, an essential object of the present invention is to provide a two-directional switch for a motor cycle or the like which is compact in size and which has a simple construction, with substantial elimination of disadvantages inherent in the conventional switch arrangements of this kind.

Another important object of the present invention is to provide a two-directional switch of the above described type which is accurate and stable in functioning, with high reliability, and can be readily incorporated into various motor cycles and the like at low cost.

In accomplishing these and other objects, according to one preferred embodiment of the present invention, there is provided a two-directional switch for use in a motor cycle and the like, arranged to change over switch members which are provided therein for a plurality of functions through sliding movement of a control knob integral with a contact holder and extending out of the switch case, in a first direction and a second direction intersecting the first direction, and comprising a switch case, a guide plate member which is accommodated in said switch case and with which said contact holder is slidably engaged for sliding movement in the first direction within the guide plate member by the control knob, guide means provided in the switch case and engaged with the guide plate member so as to guide the guide plate member and contact holder for simultaneous movement in the second direction, and first engaging means for engagement between said guide plate member and said contact holder, and second engaging means for engagement between said guide plate member and said guide means.

By the arrangement according to the present invention as described above, a compact two-directional switch highly efficient in operation has been advantageously provided by a simple construction.

BRIEF DESCRIPTION OF THE DRAWINGS

These and other objects and features of the present invention will become apparent from the following description of the preferred embodiment thereof taken in conjunction with the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
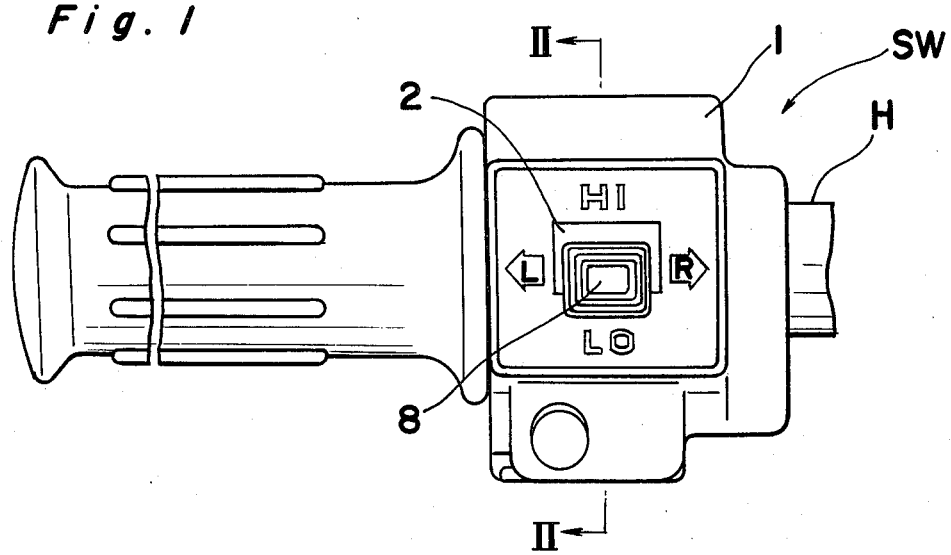
FIG. 1 is a top plan view of a two-directional switch according to one preferred embodiment of the present invention illustrated as mounted on a handle of a motor cycle.
Figure 2:
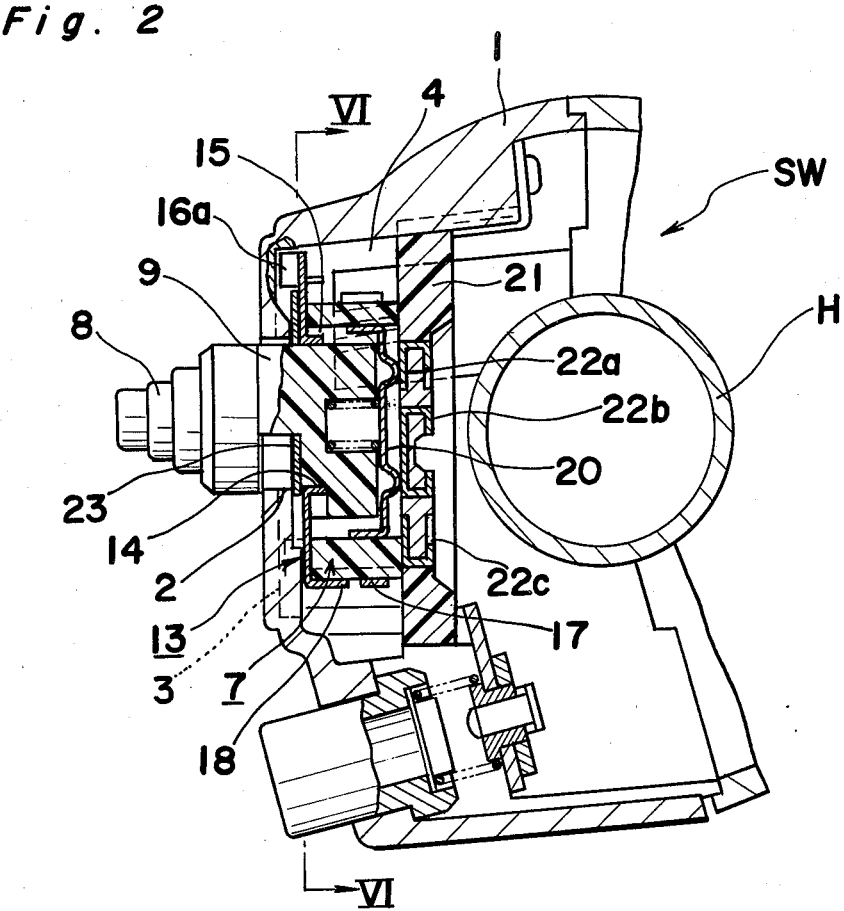
FIG. 2 is a cross-sectional view, on an enlarged scale, taken along the line II—II of FIG. 1.

Referring now to the drawings, there is shown in FIGS. 1 and 2 a two-directional switch SW for a motor cycle or the like according to one preferred embodiment of the present invention in which, for example, a direction indicating switch and a dimmer switch for the head light change-over are arranged to be actuated through sliding movements of a single control knob in two directions in a manner as described in detail hereinbelow.

In FIG. 1, the two-directional switch SW generally includes a switch case 1 to be mounted on a handle bar H of a motor cycle or the like (not shown) and having a rectangular opening 2 defined at the central portion in its one surface, and a control knob 8 extending outwardly through said opening 2, and arranged to be slidable in a lateral first direction from a neutral position at the central portion of the opening 2, selectively to a left direction indicating position L or to a right direction indicating position R for actuation of the direction indicating switch, and also to be slidable in a vertical second direction between two positions HI (high) and LO (low) so as to actuate the dimmer switch for changing over between a main head light and an auxiliary head light (not shown).

Figure 3:
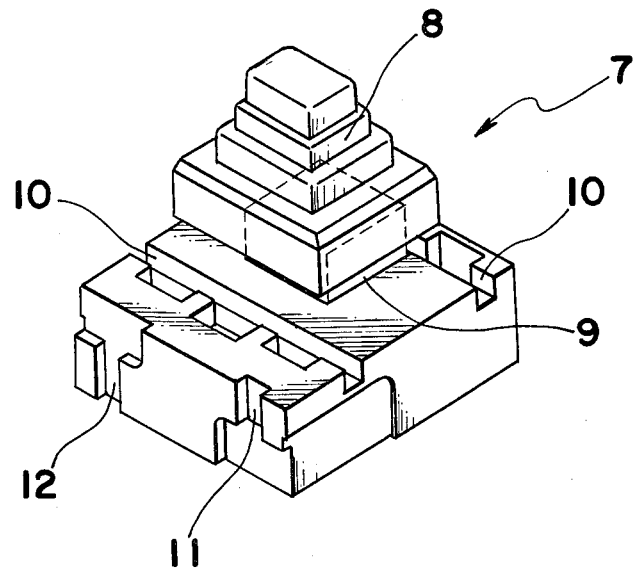
FIG. 3 is a perspective view of a contact holder employed in the two-directional switch of FIG. 1.

As is seen from FIGS. 2 and 3, the control knob 8 is integrally formed with or rigidly connected to a contact holder 7 through a neck portion 9, while in the surface of the contact holder 7 provided with the control knob 8, there are formed two spaced grooves 10 extending in a direction parallel to said first direction, and also two detent recesses 11 and 12 defined adjacent to opposite edges of one side face of the contact holder 7 parallel to said grooves 10.

Figure 4:
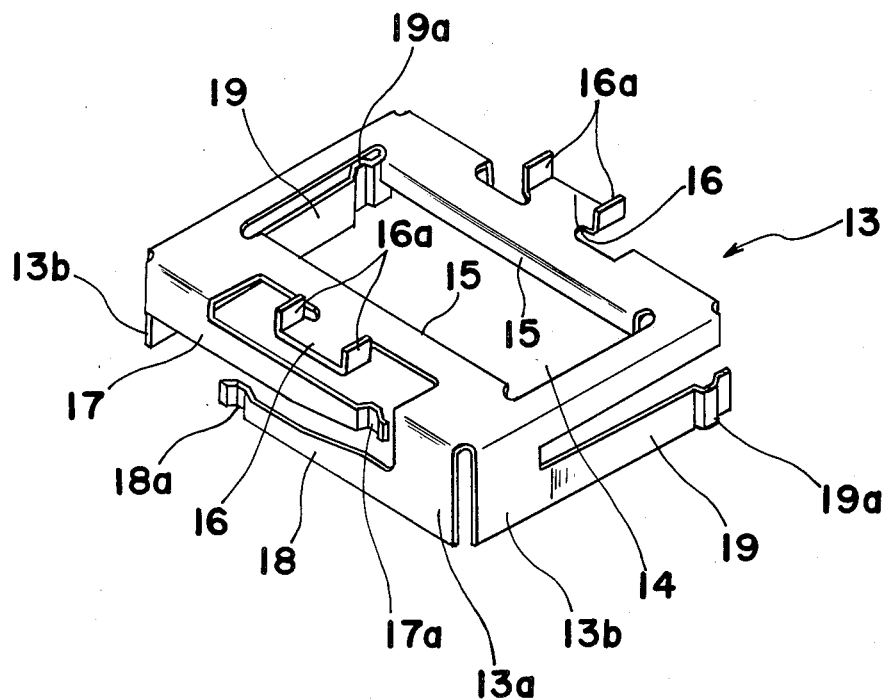
FIG. 4 is a perspective view of a guide plate employed in the two-directional switch of FIG. 1.
Figure 5:
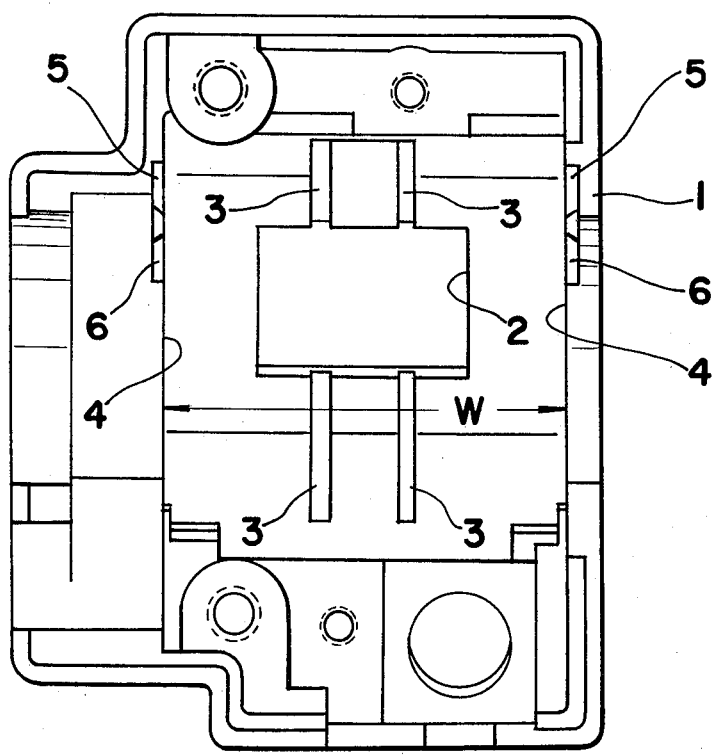
FIG. 5 is a top plan view showing, on an enlarged scale, the interior of a switch case employed in the two-directional switch of FIG. 1.
Figure 6:
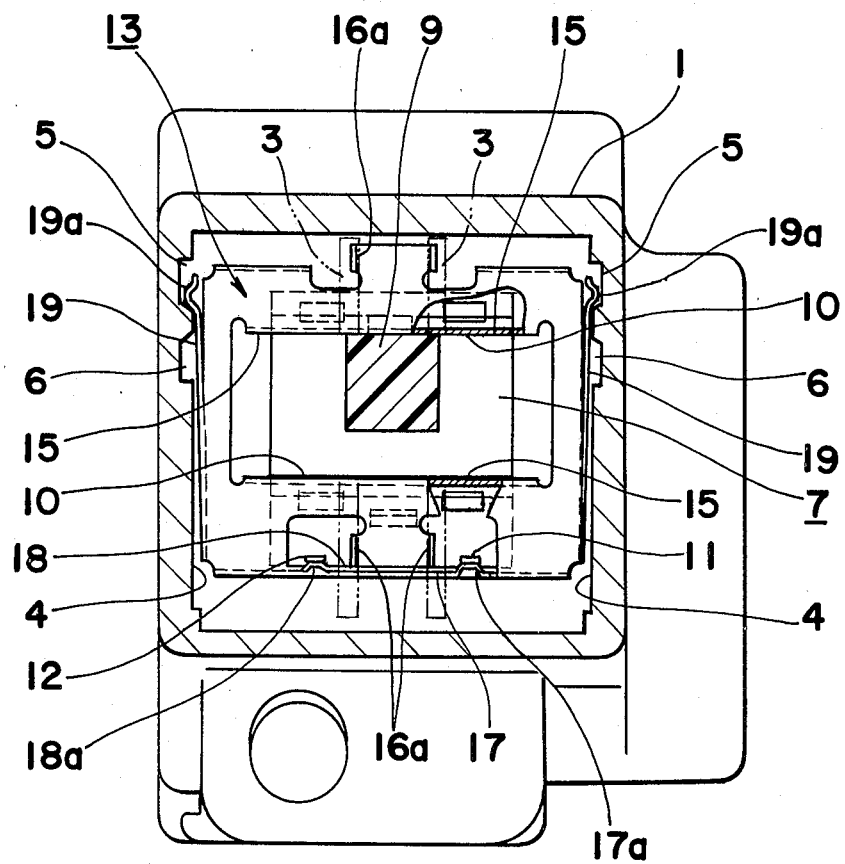
FIG. 6 is a cross section taken along the line VI—VI of FIG. 2.

The two-directional switch SW further includes a guide plate 13 (FIG. 4) having a width corresponding to the width W of an inner surface (FIG. 5) of the switch case 1 and fitted into said inner surface of the switch case 1 so as to be movable in said second direction, but immovable with respect to said first direction. In the inner surface of said switch case 1, there are formed two guide grooves 3 (FIG. 5) in a direction parallel to said second direction for serving as guide means according to the present invention, and detent recesses 5 and 6 defined to be adjacent to each other in each of side walls 4 of the inner surface of the switch case 1 as is most clearly seen in FIG. 5. Meanwhile, as shown in FIG. 4, the guide plate 13 referred to above has a rectangular guide opening 14 directed in said first direction and having a shape for passing the control knob 8 and neck portion 9 of the contact holder 7 therethrough in a position corresponding to the opening 2 of the switch case 1, a pair of engaging edges 15 formed by bending downwardly the corresponding edges of the guide opening 14 at right angles with respect to the surface of the guide plate 13, guide projections 16a formed by bending upwardly the corresponding side edges of protrusions 16 extending outwardly from the opposite side edges of the rectangular opening 14 so the guide projections will fit into the guide grooves 3 formed in the inner surface of the switch case 1 as shown in FIG. 6, first engaging plates 17 and 18 formed in one bent side wall 13a of the guide plate 13 directed in said first direction so as to be positionally staggered with respect to each other and to have their projected end portions 17a and 18a fit into the detent recesses 11 and 12 of the contact holder 7, and a second engaging plate 19 formed in each of bent side walls 13b of the guide plate 13 directed in said second direction for having the projected end portion 19a fit into either of the detent recess 5 or 6 provided in the inner surface of said switch case 1 as described earlier (FIG. 5).

It is to be noted here that the detent recesses 11 and 12 of the contact holder 7 and the first engaging plates 17 and 18 of the guide plate 13 constitute one example of first engaging means between the contact holder 7 or control knob 8 and the guide plate 13, while the detent recesses 5 and 6 of the inner surfaces of the switch case 1 and the second engaging plates 19 of the guide plate 13 form one example of second engaging means between the guide plate 13 and the guide means (i.e. guide grooves 3) provided in the inner surface of the switch case 1.

For assembly, the contact holder 7 is placed behind the guide plate 13, with the engaging edges 15 of the guide plate 13 fitted into the corresponding grooves 10 of the contact holder 7, and with the control knob 8 and neck portion 9 of the contact holder 7 extending outwardly through the guide opening 14 of the guide plate 13, and the guide projections 16a of the guide plate 13 are fitted into the guide grooves 3 of the switch case 1, with the control knob 8 and neck portion 9 of the contact holder 7 further extending through said rectangular opening 2 of the switch case 1.

Further included in the two-directional switch SW are a movable contact plate 20 mounted on the under surface of the contact holder 7 so as to correspond, for example, to a group of stationary contacts 22a, 22b and 22c provided on an insulating plate 21 (FIG. 2) for selective change-over therebetween, thereby to constitute the direction indicating switch through lateral movement of the control knob 8 from its neutral position in the first direction in FIG. 1 to the right or left side to energize or de-energize the corresponding direction indicating lights (not shown), and a dimmer switch for change-over between the main head light and auxiliary head light (not shown) through the vertical movement of the control knob 8 in the second direction in FIG. 1 upon turning ON of a light switch, and a groove cover plate 23 fitted onto the neck portion 9 of the contact holder 7 and slidably contacting the front surface of the guide plate 13 for keeping said guide plate 13 out of sight.

By the above arrangement, upon sliding movement of the control knob 8 downwardly in the second direction in FIGS. 1, 2 or 6, the guide plate 13 and the contact holder 7 are simultaneously moved through the guide grooves 3 by the engagement of the engaging edges 15 of the contact plate 13 and the grooves 10 of the contact holder 7. In the above case, the sliding movement in the second direction is not affected by the positions of the control knob 8 in said first direction, and upon sliding movement of the control knob 8 downwardly in said second direction as described above, the projected end portions 19a of the second engaging plates 19 of the guide plate 13 enter the detent recesses 6, while upon sliding movement thereof upwardly in said second direction, said end portions 19a of the second engaging plates 19 enter the detent recesses 5 so as to prevent undesirable movement of the control knob 8. On the other hand, in the lateral first direction, when the control knob 8 is held at the neutral position in FIG. 1, the first engaging plates 17 and 18 of the guide plate 13 are fitted in the detent recesses 11 and 12 of the contact holder 7 to be engaged therewith, and although said first engaging plates 17 and 18 slip out of the detent recesses 11 and 12 upon sliding movement of the control knob 8 towards the left, the projected end portion 17a of the first engaging plate 17 engages the right side corner portion of the contact holder 7, while upon sliding movement of the control knob 8 towards the right in FIG. 1, the projected end portion 18a of the first engaging plate 18 engages the left side corner portion of the contact holder 7 to maintain respective sliding positions. The sliding movements as described above are effected by the movement through the grooves 10 of the contact holder 7 in which the engaging edges 15 of the guide plate 13 are fitted.

As is clear from the foregoing description in the two-directional switch of the present invention, the parts are so arranged that, with the control knob for the contact holder being adapted to slide in the first direction and the second direction intersecting said first direction approximately at right angles therewith, the sliding movement in said first direction is guided by the guide plate, and the sliding movement in said second direction is guided by the guide means for guiding said guide plate, while engaging means are provided respectively between the guide plate and the contact holder or control knob and between the guide plate and guide means so as to prevent the control knob from unduly moving from the predetermined position in either of said first and second directions.

Therefore, it is possible to control functionings of at least two kinds of switches by properly moving the control knob extending out of the switch case in the first and second directions, while the two directional switch itself may be made compact and yet have a simple construction, since the engaging means for the contact holder in each of said first and second directions is provided mainly with respect to the guide plate.

It is to be noted here that, in the foregoing embodiment, although the present invention is mainly described with reference to the two-directional switch for a motor cycle, the concept of the present invention is not limited in its application to a motor cycle, but may readily be applicable to multi-directional switches in general in which a compact size and simple construction for efficient operation are required.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. A two-directional switch arranged to change over switch members provided therein for a plurality of functions through sliding movement of a control knob integral with a contact holder and extending out of the switch case, in a first direction and a second direction intersecting said first direction, said two-directional switch comprising a switch case, a guide plate member which is accommodated in said switch case and with which said contact holder is slidably engaged for sliding movement in said first direction within said guide plate member by said control knob, guide means provided in said switch case and engaged with said guide plate member so as to guide said guide plate member and contact holder for simultaneous movement in said second direction, and first engaging means for engagement between said guide plate member and said contact holder and second engaging means for engagement between said guide plate member and said guide means.

2. A two-directional switch as claimed in claim 1, wherein said first direction is arranged to intersect approximately at right angles with said second direction.

3. A two-directional switch as claimed in claim 1, wherein said guide plate member is provided with a pair of guide edges formed by bending corresponding edges of an opening defined therein through which said knob extends outwardly therethrough, said guide edges being slidably engaged with corresponding grooves formed in said contact holder for permitting the sliding movement of said contact holder within said guide plate member in said first direction, and also for permitting simultaneous movement of said guide plate member and said contact holder in said second direction within said switch case.

4. A two-directional switch as claimed in claim 1, wherein said guide means is a plurality of grooves formed in said switch case and slidably receiving therein corresponding guide projections formed on said guide plate member.

5. A two-directional switch as claimed in claim 1, wherein said first engaging means for the engagement between said guide plate member and said contact holder includes a plurality of detent recesses formed in one side wall of said contact holder and corresponding engaging plates provided in a corresponding side wall of said guide plate member.

6. A two-directional switch as claimed in claim 1, wherein said second engaging means for the engagement between said guide plate member and said guide means includes a plurality of detent recesses formed in opposite side walls of said contact holder and corresponding engaging plates provided in corresponding side walls of said guide plate member.

7. A two-directional switch as claimed in claim 1, wherein said switch members include a movable contact plate provided on said contact holder and a group of stationary contacts provided in said switch case for selective contact with said movable contact plate.

8. A two-directional switch as claimed in claim 7, wherein said switch members constitute a direction indicating switch for selectively turning ON and OFF right and a left direction indicating lights upon lateral movement of said control knob in said first direction, and a dimmer switch for switching over between a main head light and an auxiliary head light upon vertical movement of said knob in said second direction.

* * * * *